(12) United States Patent
Thell et al.

(10) Patent No.: US 8,412,564 B1
(45) Date of Patent: Apr. 2, 2013

(54) SYSTEM AND METHOD FOR IDENTIFYING EXCELLENCE WITHIN A PROFESSION

(75) Inventors: Charles F. Thell, St. Paul, MN (US); William C. White, Hopkins, MN (US); Cindy Larson, Eden Prairie, MN (US)

(73) Assignee: Thomson Reuters, New York, NY (US)

( * ) Notice: Subject to any disclaimer, the term of this patent is extended or adjusted under 35 U.S.C. 154(b) by 1222 days.

(21) Appl. No.: 12/109,985

(22) Filed: Apr. 25, 2008

Related U.S. Application Data

(60) Provisional application No. 60/913,869, filed on Apr. 25, 2007.

(51) Int. Cl.
*G06Q 10/00* (2012.01)

(52) U.S. Cl. .................................................. 705/7.42

(58) Field of Classification Search .............. 705/7.42
See application file for complete search history.

(56) References Cited

U.S. PATENT DOCUMENTS

| | | | |
|---|---|---|---|
| 5,416,694 A | 5/1995 | Parrish et al. | |
| 6,049,776 A | 4/2000 | Donnelly et al. | |
| 6,289,340 B1 | 9/2001 | Puram et al. | |
| 6,381,592 B1 | 4/2002 | Reuning | |
| 6,385,620 B1 | 5/2002 | Kurzius et al. | |
| 6,618,734 B1 | 9/2003 | Williams et al. | |
| 6,691,122 B1 | 2/2004 | Witte et al. | |
| 6,873,964 B1 | 3/2005 | Williams et al. | |
| 6,877,034 B1 * | 4/2005 | Machin et al. | 709/223 |
| 7,080,057 B2 | 7/2006 | Scarborough et al. | |
| 7,367,808 B1 * | 5/2008 | Frank et al. | 434/219 |
| 2001/0034011 A1 * | 10/2001 | Bouchard | 434/236 |
| 2002/0019765 A1 * | 2/2002 | Mann et al. | 705/11 |
| 2002/0024531 A1 * | 2/2002 | Herrell, III | 345/700 |
| 2002/0178017 A1 | 11/2002 | Stevens et al. | |
| 2002/0184085 A1 * | 12/2002 | Lindia et al. | 705/11 |
| 2003/0078804 A1 * | 4/2003 | Morrel-Samuels | 705/1 |
| 2003/0084014 A1 | 5/2003 | Sohrabi et al. | |
| 2003/0163363 A1 | 8/2003 | Pratte et al. | |
| 2004/0044538 A1 | 3/2004 | Mauzy et al. | |
| 2005/0033633 A1 | 2/2005 | LaPasta et al. | |
| 2005/0055256 A1 | 3/2005 | Scott | |
| 2005/0075930 A1 * | 4/2005 | Hussain et al. | 705/14 |
| 2005/0228762 A1 | 10/2005 | D'Elena et al. | |

(Continued)

OTHER PUBLICATIONS

Castleconnolly.com Nomination Process—How does Castle Connolly Medical Ltd. Select America's Top Doctors? 2 pages, 2008.

(Continued)

*Primary Examiner* — Jonathan G Sterrett
(74) *Attorney, Agent, or Firm* — Edwards Wildman Palmer LLP; David J. Silvia; Adam P. Daniels

(57) ABSTRACT

The present invention provides for a system and method of identifying excellence within a profession. In one embodiment, excellent performing candidates within a profession group are identified by creating a candidate pool from independent research and a peer nomination process. Identified candidates then obtain a score according to an independent research and objective evaluation process. Peer evaluators contribute to this score by evaluating top-scoring candidates, and a total score is compiled for each identified candidate. Candidates with scores in a top percentage of the candidates are then recognized as demonstrating excellent performance in the profession group.

13 Claims, 4 Drawing Sheets

U.S. PATENT DOCUMENTS

| | | |
|---|---|---|
| 2006/0212305 A1 | 9/2006 | Bogle et al. |
| 2006/0212338 A1 | 9/2006 | Bogle et al. |
| 2006/0212416 A1 | 9/2006 | Taylor et al. |
| 2006/0212448 A1 | 9/2006 | Bogle et al. |
| 2006/0212466 A1* | 9/2006 | Hyder et al. .................. 707/101 |
| 2006/0241974 A1* | 10/2006 | Chao et al. ........................ 705/2 |
| 2007/0174111 A1* | 7/2007 | Anderson et al. ............... 705/11 |
| 2008/0040130 A1* | 2/2008 | Lederman et al. ................ 705/1 |
| 2008/0077461 A1* | 3/2008 | Glick ............................... 705/7 |
| 2008/0114608 A1* | 5/2008 | Bastien ............................. 705/1 |

OTHER PUBLICATIONS

Best Lawyers, "A thorough, reliable and valuable resource for all who seek the best in our profession," 1 page, 2007.
Chambers and Partners "Rankings Explained," 1 page, 2008.
Martindale-Hubbell, "A unique service to the Bar," 5 pages, 2008.
U.S. News, "How They Were Picked," 3 pages, Nov. 12, 2007.
Law Dragon, "Fast Facts", 2 pages, 2008.
Law Dragon, "Lawdragon FAQs", 3 pages, 2008.

* cited by examiner

Fig. 2

SYSTEM AND METHOD FOR IDENTIFYING EXCELLENCE WITHIN A PROFESSION

CROSS REFERENCE TO RELATED APPLICATIONS

This application claims priority from U.S. provisional application Ser. No. 60/913,869, filed Apr. 25, 2007.

BACKGROUND OF THE INVENTION

1. Field of the Invention

The present invention relates to a system and method for identifying excellent performance of individuals within a profession. More particularly, the present invention relates to a system and method for data searching and mining operations to provide an objective indication of peer recognition and/or professional achievement.

2. Discussion of the Related Art

Awarding professional achievement through peer recognition is known. Professionals generally nominate colleagues within their profession via a balloting process. Balloting processes can be conducted in a variety of ways, including anonymous balloting, in person balloting, paper balloting, computer balloting, and the like. In some instances, results of the balloting process are reviewed by a group of professionals through a peer review process. In the peer review process, a sub-group of the profession gathers to vote on the candidates nominated through the balloting process.

While these types of selection processes can provide useful information about performance of individuals within a profession, there are several problems with these processes. There are concerns that individuals will nominate themselves in the hope of being selected as an excellent performer within a profession. For example, one physician may nominate herself as an excellent performer in a particular medical practice area in order to attain marketing and/or other financial advantages over her competitors. Some of the known balloting processes prohibit professionals from nominating themselves during the balloting process.

Despite prohibitions against self-nominations during the balloting process, there are also concerns that groups of professionals may collaborate to nominate one another during the balloting process. For example, one law firm may collaborate with another law firm to nominate lawyers from the other law firm in exchange for nominations of lawyers working in their firm. Based on the foregoing, there is a need for additional rules and monitoring of the balloting process.

In some instances, there can be problems defining a particular profession and/or a sub-group within a profession. For example, some lawyers practice in the areas of family law and criminal defense law. Their peers in each of the areas may not be aware of their efforts in the other practice area. Alternately, their peers may confuse their work in one area with their work in the other area. This could result in a professional being nominated and selected as an excellent performer in one area based on their performance in another, unrelated area. Alternately, attorneys splitting their time between two areas of law may not be adequately recognized for excellent performance in both areas because their peer groups may be slightly different in each area. Thus, there is a need for objective definition of professions and/or sub-groups within a profession. There is also a need for evaluation of professionals based on all of the activities in which they are professionally engaged.

There are often problems with the subjectivity of criteria defining excellent performance within a profession. This can be exacerbated by open balloting processes that are not based on a defined set of criteria for nominations. For example, when determining excellent performance within the field of dentistry, some dentists may heavily weigh the number of patients serviced by a dental office in a given time period while other dentists may place greater weight on the type of technology employed by a dental office when rendering services to patients. Based on the foregoing, there is a need for objective, well-defined criteria for determining excellent performance within a profession and/or profession sub-group.

There are also problems with information used to determine whether an individual is currently an excellent performer within a profession. These problems are magnified for repeat selection processes, such as monthly, semi-annual, and/or annual nominations for excellent performance within a profession. For example, an accountant may be nominated by his peers for his performance during the course of his 25-year career, notwithstanding the fact that he was selected as an excellent performer for previous years and, during the present selection year he did not exhibit excellent performance. Accordingly, there is a need for a system and method for identifying excellent performance of professionals that is based on current information and/or a combination of current and historical information.

There can also be problems with peer review of professionals nominated for excellent performance within a profession. These problems can include the bias and subjectivity issues previously discussed with regard to the balloting process. Another problem might be lack of current information about candidates incorporating changes from the time of balloting to the peer review process. For example, between the balloting process and the peer review process, a professional might move away from the geographical area for which the selection is occurring. Another example might be a change in the professional's career, such as an attorney accepting a judicial appointment, thereby barring her eligibility for selection. Thus, there is a need for monitoring and evaluation of the results of various stages in a selection process.

SUMMARY OF THE INVENTION

One aspect of the present invention includes a system and method for identifying excellent performance of professionals based on defined groups and/or sub-groups of professionals. Additionally, another aspect of the present invention includes rules and monitoring for a nomination and balloting process to identify and evaluate excellent performing candidates by one or more selected groups of peer professionals.

Another aspect of the present invention includes identifying excellent performance of professionals based on evaluation of relevant activities in which individuals are professionally engaged in, including identifying excellent performance of professionals through objective, well-defined criteria for these activities. A further aspect of the present invention includes a performing independent research to identify professionals based on current information and/or a combination of current and historical information. A further aspect of the present invention also identifies excellent performance of professionals through monitoring and evaluation of results from various stages in a selection process.

In one embodiment of the present invention, the process of identifying excellent performing candidates within a profession group includes creating a candidate pool, conducting objective evaluations and peer evaluations of candidates within the candidate pool to produce a numerical score for the candidates, selecting individuals with scores in a top percentage of the candidates, and identifying the selected individuals as demonstrating excellent performance in the profession group.

In a further embodiment of the present invention, the process of identifying excellent performing candidates includes creating a candidate pool from a survey of peer professionals working within the profession group in conjunction with conducting independent research to identify candidates. The peer survey allows other professionals in the candidate profession group to nominate outstanding performing individuals who are located within a defined geographic area. The peer survey is performed by peers who meet a defined set of qualifications, such as by practicing in the profession group for a minimum number of years. Additionally, the independent research allows high performing candidates who may otherwise be overlooked in a peer nomination process to be discovered.

Once the candidate pool is established, evaluations are conducted of each of the individuals in the candidate pool. Independent research is performed to mine data relevant to professional performance for each candidate. This data is then compiled and stored according to a number of objective criteria relevant to high performance within the profession group. Based on the compiled information, a numerical evaluation is produced and stored for each candidate.

The names of the top scoring candidates are then provided to a set of peers to perform peer evaluation. In one embodiment of the present invention, the peers are selected from a group of individuals who are presently or historically identified as high performing individuals within the profession group. A peer evaluation score is then produced for the top scoring candidates based on the results of the peer evaluation.

Finally, the scores from each of the evaluation processes are combined to produce a total score for each of the candidates. The candidates with point totals in a predetermined top percentage of the candidate pool are identified as demonstrating excellent performance within the profession group. In a further embodiment, the candidates within the predetermined top percentage of the candidate pool are divided into various groups based on common characteristics, such as firm or organization size.

The present invention will be further described with reference to the following detailed description in conjunction with the drawings.

BRIEF DESCRIPTION OF THE DRAWINGS

FIG. 2 is an illustration of a graphic user interface utilized within a processing configuration in accordance with one embodiment of the present invention;

DETAILED DESCRIPTION

Figure 1:
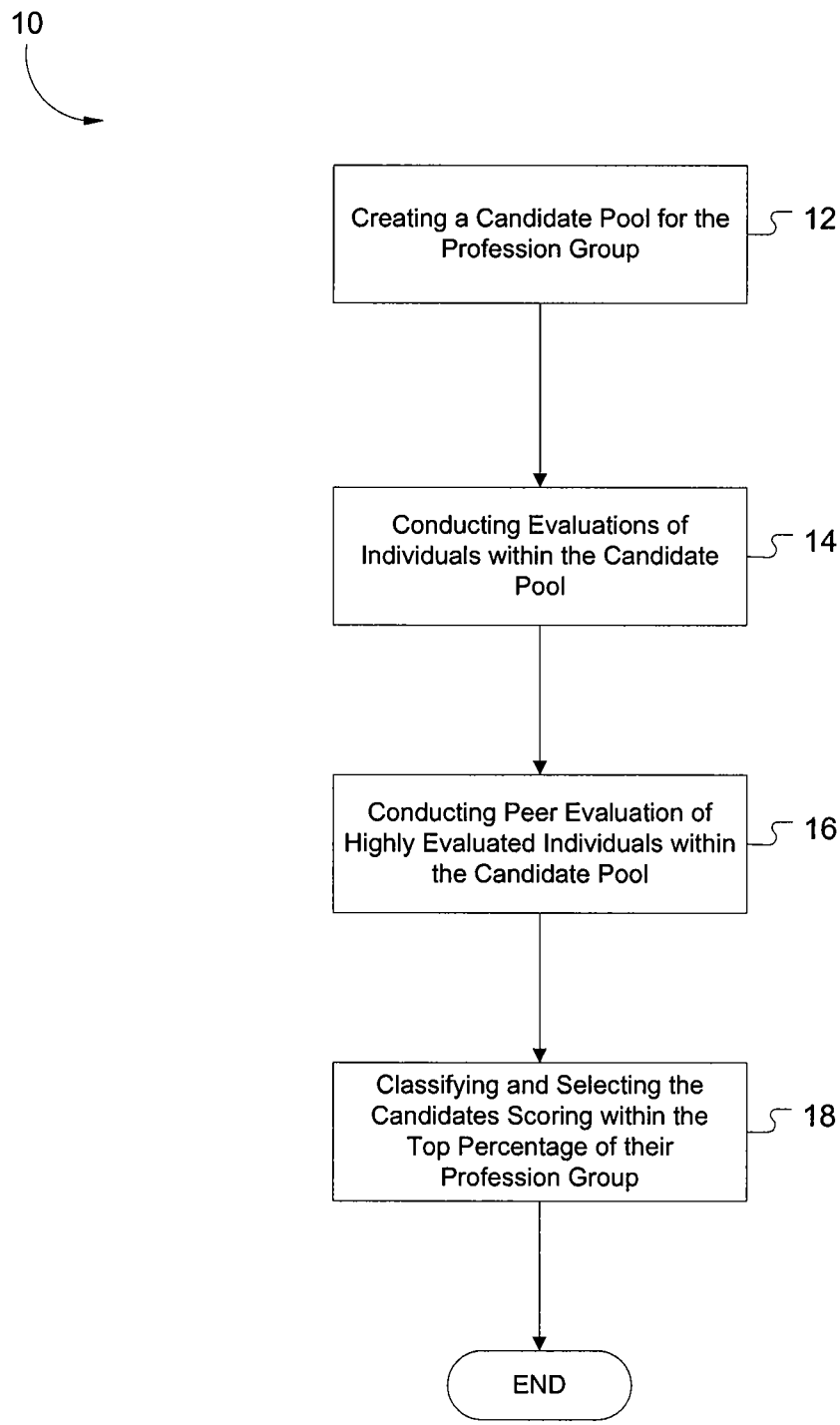
FIG. 1 is a flowchart illustrating a method of identifying excellent performance of professionals within a profession group and/or subgroup according to one embodiment of the present invention.

FIG. 1 depicts a flowchart for one embodiment of a method for identifying excellent performance of professionals within a particular professional group and/or sub-group. Method 10 includes the steps of: creating a candidate pool 12; evaluating individuals within the candidate pool 14; conducting peer evaluations of individual candidates in candidate pools defined by professional group and/or sub-group 16; and final selection of individual candidates that demonstrate excellent performance within a particular classification of the professional group and/or subgroup 18.

The term "excellent performance of professionals" as used herein is defined broadly as performance that falls within a top percentage of performance for professionals within a profession group and/or sub-group according to objective criteria as hereinafter defined. Those skilled in the art can appreciate that the percentage and the criteria can vary depending on the profession group and/or sub-group. Profession groups include but are not limited to lawyers, doctors, dentists, accountants, architects, engineers, and the like.

In one example, the profession group for lawyers can be separated into 67 sub-groups, including but not limited to administrative law, alternative dispute resolution, antitrust litigation, appellate, banking, bankruptcy & creditor/debtor rights, bonds/government finance, business litigation, business/corporate, civil litigation defense, civil rights, class action/mass torts, closely held business, construction litigation, construction/surety, criminal defense, criminal defense for DUI/DWI, criminal defense for white collar crimes, criminal prosecution, elder law, employee benefits/ERISA, employment & labor, employment litigation defense, employment litigation representing plaintiffs, energy and natural resources, entertainment and sports, environmental, environmental litigation, estate planning and probate, family law, first amendment/media, franchise/dealership, general litigation, government/cities/municipalities, health care, immigration, information technology/outsourcing, insurance coverage, intellectual property, intellectual property litigation, international, land use/zoning, legal aid/legal services, mergers and acquisitions, non-profit, general personal injury defense, medical personal injury defense, products personal injury defense, general personal injury representing plaintiffs, medical personal injury representing plaintiffs, products personal injury representing plaintiffs, political law, professional liability defense, professional liability representing plaintiffs, real estate, schools and education, securities and corporate finance, securities litigation, tax, transportation/maritime, utilities, workers' compensation, communications, FDA, government contracts, government relations, projects, and the like.

In another example, the profession group for doctors is separated into 29 sub-groups, including but not limited to allergy and immunology, cardiology, dermatology, endocrinology, reproductive endocrinology, gastroenterology, general/family practice, hematology, internal medicine, nephrology, neurology, obstetrics/gynecology, oncology, ophthalmology, otolaryngology, pediatrics, physical medicine/rehabilitation, pulmonary medicine, rheumatology, sports medicine, cardiac surgery, colon and rectal surgery, cosmetic surgery, general surgery, neurological surgery, orthopedic surgery, pediatric surgery, urology and the like. In yet another example, the profession group for dentists can be separated into at least 7 sub-groups, including but not limited to cosmetic, endodontist, general practice, oral and maxillofacial surgery, orthodontist, pediatric, prosthodontist, and the like. In still a further example, the profession group of engineers can be separated into 7 sub-groups, including but not limited to electrical engineers, mechanical engineers, chemical engineers, civil engineers, environmental engineers, aeronautical engineers, and materials engineers.

The previous profession groups and sub-groups are included as examples. Those skilled in the art can appreciate that the present invention can be used for various other profession groups and/or sub-groups.

Step 12 for creating a candidate pool includes performing a peer survey of professionals working within a particular professional group and/or sub-group to obtain nominations of other excellent performing professionals. In addition to conducting surveys based on profession groups and/or sub-groups, surveys can be conducted at various time intervals, including but not limited to monthly, semi-annually, annually, and the like. Surveys can also be conducted on a geographic basis, for example, by providing nomination forms or ballots to all professionals in the geographic region who meet a set of minimum qualifications to provide nominations.

In one embodiment, in order to participate in the nomination process, survey participants must have a required minimum amount of service within the profession group and/or sub-group for which method 10 is being conducted. Exemplary minimum requirements include but are not limited to length of time working in a particular profession group and/or sub-group, type and/or amount of education applicable to work conducted in a particular profession group and/or sub-group, type of position within a profession group and/or sub-group, and the like. In one embodiment, the professionals must have practiced in the profession group for 5 years or more.

In one embodiment of the present invention, survey participants can only nominate other professionals that they have witnessed performing professional duties. In another embodiment of the present invention, survey participants are not allowed to nominate themselves. In still another embodiment, survey participants can nominate their professional colleagues within their professional firm or company provided that they nominate a commensurate number of other individuals within the profession group and/or sub-group who are not employed by their professional firm or company. Additionally, the number of nominations per survey can be limited to prevent unfair advantage to professionals having several colleagues. For example, in one embodiment, a professional may nominate no more than 7 other professionals practicing at his or her organization or firm, and is also required to nominate an equal or greater number of professionals practicing outside of his or her organization or firm.

Survey participants can also be limited to nominating professionals based on the type of work an individual does within a particular profession group and/or sub-group. In one example, nominees for excellence within the legal field need not work in private practice law firms. In this example, survey participants are allowed to nominate legal aid attorneys, prosecutors, and/or in-house counsel but may not nominate judges and/or legislators. In another example, nominees for excellence within the healthcare field need not work in hospitals. In this example, survey participants are allowed to nominate clinicians, research physicians, and/or military healthcare providers but may not nominate medical school professors or hospital administrators. These types of nomination limitations are clearly communicated to survey participants within the survey materials.

In a further embodiment of the present invention, points may be allocated to a candidate based on the type of nomination received for the candidate. In one embodiment, 5 points are awarded for nominations of the candidate from persons outside of their firm or organization, and 3 points are awarded for nominations of the person from others within the nominee's firm or organization. In a further embodiment, portions of the points obtained from the nomination process in previous years are carried forward to the present year. Accordingly, all attorneys who have obtained points in the current year or carried forward from previous years are eligible candidates. In still a further embodiment, two-thirds of the points obtained from the previous year nomination process carry forward to the current year, and one-third of the points obtained from the nomination process of two years previous carry forward to the current year.

Step 12 for creating a candidate pool may also include an independent research process to search for qualified candidates who are not nominated by their peers. This independent research includes conducting data mining of various data sources to identify additional individuals who potentially demonstrate excellent performance within a profession group and/or sub-group based on typical indicators of peer recognition and/or professional achievement.

In one embodiment, an independent research team searches various information sources for indicia of excellent performance to discover additional candidates. Examples of information sources include but are not limited to: national and local periodicals, trade journals, bulletins, or any other publications that are widely disseminated within a particular profession group and/or sub-group; databases and other on-line data sources provided by private organizations; membership in professional associations; membership in bar associations and published verdict information (for attorneys); participation in professional academies and colleges; and the results of in-person and telephonic interviews with certification organizations, ethics boards, and professionals within the profession group and/or sub-group and the like. For example, an attorney's membership in the invitation-only American College of Trial Lawyers would provide peer recognition that the attorney has attained high levels of achievement and experience within the legal profession.

In a further embodiment, the independent research and data mining to discover additional candidates is conducted via computer operations that compile and refine the results. Those skilled in the art will appreciate that an appropriate selection of the information sources is dependent on the desired scope of search and the applicable professional field, and in addition, a variety of computer-assisted data mining techniques and methods may be applied to refine the results of the independent research.

Information about professionals identified via the independent research process in step 12 is stored, including adding information for the pool of candidates identified through the aforementioned peer survey process. Additionally, the results of the independent research and peer survey processes can be compared to ensure that duplicate candidates are eliminated. The comparison can be conducted manually and/or via computer operations.

Step 14 for evaluating individuals within the candidate pool includes performing further research and data mining for information that substantiates an individual's performance according to objective criteria. In one embodiment, objective criteria for identifying excellent performance of professionals in the legal profession include but are not limited to verdicts and settlements, transactions, representative clients, experience, honors and awards, special licenses and certifications, position within law firm, bar and other professional activity, pro bono and community service, scholarly lectures and writings, education and employment background, other outstanding achievement, and the like.

In another embodiment, objective criteria for identifying excellent performance of professionals in the doctor profession include but are not limited to awards if indicative of peer recognition, acceptance of Medicare and/or Medicaid, academic positions, leadership positions in associations/societies/other professional organizations, number of years practicing in certification area, number of years practicing in subspecialty, publications, fellowships, number of peer nominations, and/or peer evaluation by specialty area.

In still another embodiment, objective criteria for identifying excellent performance in the dentist profession include but are not limited to fellowship with the American College of Dentists, fellowship or master with the Academy of General Dentistry, teaching/academic positions, publications, certification in a specialty, leadership positions in associations/societies/other professional organizations, and/or awards if indicative of peer recognition. In yet another embodiment, objective criteria for identifying excellent performance in the accounting profession include but are not limited to number and/or financial size of contracts originated, representative clients, experience, honors and awards, special licenses and certifications, position within a accounting firm, professional activity, community service, scholarly lectures and writings, education and employment background, service as expert legal witness, other outstanding achievement, and the like.

The aforementioned criteria for each profession group are exemplary criteria. Those skilled in the art can appreciate that various objective criteria can be used to identify excellent performance of professionals within particular profession groups and/or sub-groups. Those skilled in the art can also appreciate that the objective criteria can be changed over time to ensure they adequately identify excellent performance within a profession.

Independent research and data mining for step 14 can be conducted manually and/or via computer processes as previously discussed to obtain relevant information relevant to the objective criteria. The objective criteria are correlated with a standardized scoring system such that performance of individual nominees can be scored and compared. In one embodiment, nominees earning a total number of points within a predetermined percentage threshold will be advanced to step 16 for peer evaluation. In a further embodiment, nominees with point totals in the top 2% to 25% of all nominees will advance to step 16 for peer evaluation. In another embodiment, nominees with point totals in the top 5% to 10% of all nominees will advance to step 16 for peer evaluation. Those skilled in the art can appreciate that the percentage threshold can be varied depending on the characteristics and/or size of the particular profession group and/or sub-group.

Figure 2:
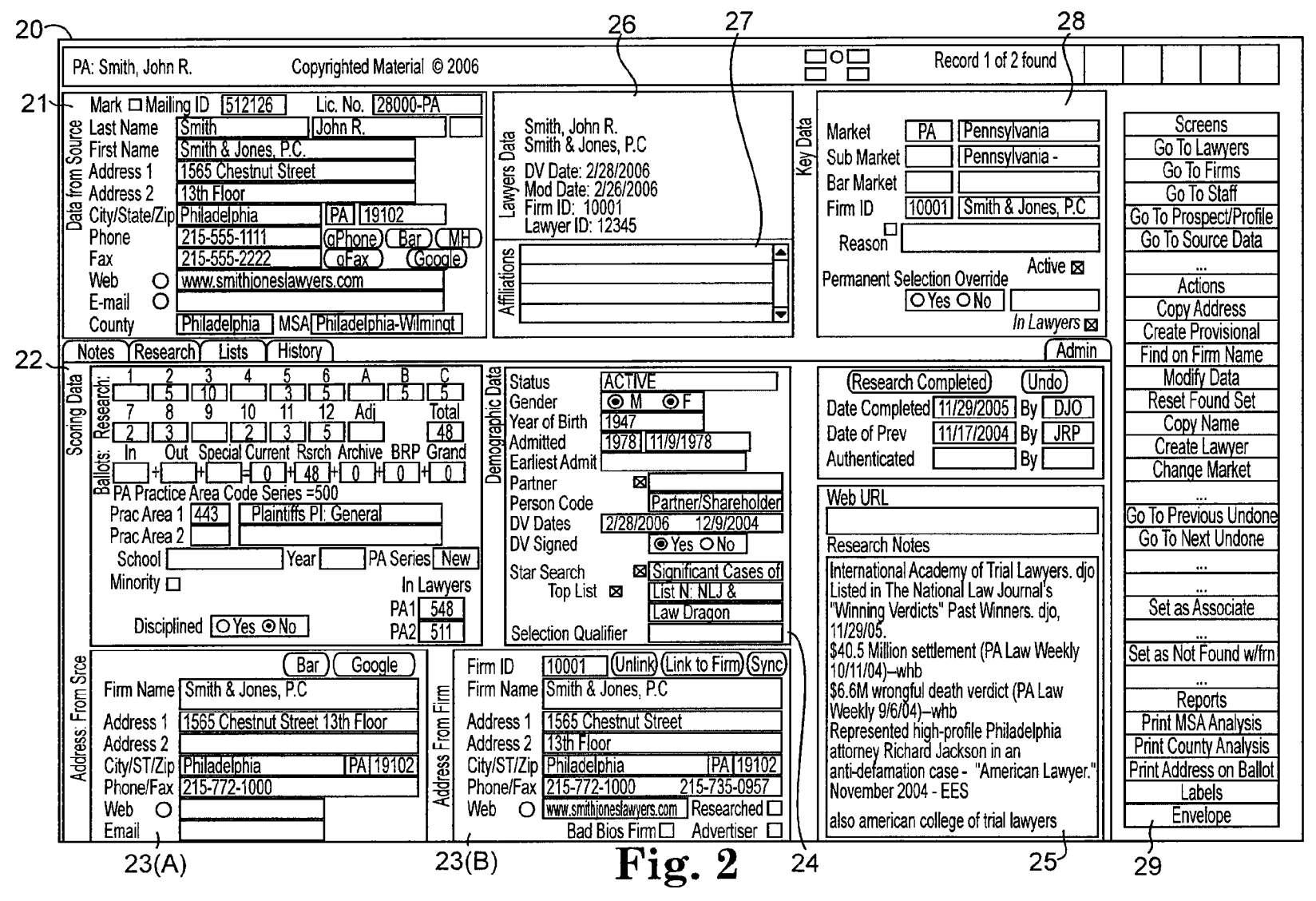

Referring now to FIG. 2, there is shown one embodiment of a graphical user interface (GUI) 20 that can be used in an appropriately configured computer system for assisting with independent research and data collection in accordance with the present invention. GUI 20 depicts data pertaining to a candidate in the attorney profession group. Those skilled in the art can appreciate that GUI 20 can be configured for use with various other profession groups. GUI 20 is divided in several sections, each section including a number of fields which contain information and information inputs for a selected practicing professional in a particular geographic region.

As depicted in FIG. 2, these fields within the GUI 20 include: a source data section 21 containing address and contact information for the professional; a scoring section 22 to enable scoring of characteristics of the individual; address sections 23(A) and 23(B) containing relevant address information for the individual; a demographic data section 24 containing relevant demographic data for the individual; a research section 25 containing relevant research notes and information for the individual; a professional data section 26 listing relevant firm and certification or licensing information for the individual; a affiliations section 27 listing relevant professional affiliations for the individual; a key data section 28 listing geographic and market information for the individual; and an action section 29 enabling actions to be performed on various graphical interface screens, actions, and reports.

Within the GUI 20, the various information and scoring sections 21-29 enable step 12 for research of individuals for creating a candidate pool and/or step 14 for performing independent research and evaluation of individuals within a candidate pool. For example, the source data section 21 includes several web links that can be used to assist in the independent research of professional. Internet links within the source data section 21 auto-fill Internet searches of the professional's name and city. This can be useful for finding websites for a professional's employers, partnerships, clinics, and the like. Similarly, licensing and/or certification links within the source data section 21 enable verification of the professional's status and current work affiliation with licensing and/or certification authorities for that market, and which may also be useful for verifying professional contact information. A professional locator link within the source data section 21 can also be used to search for the professional's locator listing, which can provide the professional's employer, contact information, and limited biographical information. The professional's employer website can be opened by clicking a web icon within the source data section 21. The professional's employer website, professional locator listing, and any references found via Internet searching, can all be used to determine a research score for an individual professional.

Research score information can be entered in a scoring data area 22 in GUI 20. As shown in FIG. 2, individual boxes numbered 1-12 in scoring data area 22 are editable fields used to record the research scores. The number of individual boxes corresponds to the number of objective criteria used to identify excellent performance within a particular profession group and/or sub-group. Accordingly, the number of boxes can vary depending on the number of objective criteria on which a professional's performance is being analyzed. Each of the objective criteria has a maximum point total. Following are objective criteria, maximum point totals and scoring guidelines for one embodiment of the lawyer profession group. In this embodiment, lawyers are scored for 12 objective criteria, including: honors, awards and peer recognition; verdicts, settlements and transactions; professional certification; representative clients; experience; position within a firm; professional activities; writings and lectures; volunteer, pro bono and community work; preparatory background; courts; and discretionary information.

There may be a 5 point maximum for the objective criterion of honors, awards and peer recognition. Other suitable maximums may be used. A professional's score for this criterion is entered in box number one in scoring data area 22 in GUI 20 and stored. When allotting points to this criterion, awards given by other publications, news sources, professional organizations and the like can be considered. Professionals receiving these types of awards can earn up to 5 points to be entered into box number one in scoring data area 22. In one embodiment, professionals can earn up to 5 points only if the award was won during a predetermined time period. Professionals can earn a lower number of points or no points for awards won prior to the predetermined time period. In another embodiment, professionals can earn more points if they are a repeat recipient of the same award.

There may be a 5 point maximum for the objective criterion of verdicts, settlements, and transactions. Other suitable maximums may be used. A professional's score for this criterion is entered in box number two in scoring data area 22 in GUI 20 and stored. When determining points for this criterion, recent transactions, complexity of transactions, level/type of court hearing cases, number of transactions, social significance of subject matter being litigated or negotiated, dollar amounts of settlements and/or verdicts, case volume and the like can be considered. In one embodiment, activity in the aforementioned areas within a predetermined time period can be given more points than similar activity occurring prior to the predetermined time period. For example, a lawyer could earn 5 points if she received a verdict of $1 million or more within the last 10 years. In other embodiments directed at other profession groups, this criterion could include volume of patients seen for doctors and/or dentists, number of design projects completed and/or capital amounts of projects completed for engineers and the like.

There may be a 10 point maximum for the objective criterion of professional certification. Other suitable maximums may be used. A professional's score for this criterion is entered in box number three in scoring data area 22 in GUI 20 and stored. When assigning points for this criterion, professionals can earn points if they are certified as a specialist in a particular professional sub-group within a particular geographic area.

Some exemplary specialty areas for the legal profession group include but are not limited to: admiralty and maritime law; antitrust and trade regulation law; appellate practice; aviation law; business litigation; city, county and local government law; civil trial law; construction law; criminal appellate law; criminal trial law; elder law; health law; immigration and nationality law; international law; labor and employment law; marital and family law; real estate law; tax law; wills, estates and trusts law; worker's compensation law; and the like. Those skilled in the art can appreciate that specialty areas can vary in different geographic regions. Some exemplary specialties in the medical profession group include but are not limited to allergy and immunology, anesthesiology, colon and rectal surgery, dermatology, emergency medicine, family medicine, internal medicine, neurological surgery, obstetrics and gynecology, ophthalmology, orthopaedic surgery, otolaryngology, pediatrics, physical medicine and rehabilitation, plastic surgery, psychiatry, neurology, and the like. Professionals can earn more points if they participate in more than one sub-group.

Professionals can also earn points for the objective criterion of professional certification if they are a member of any of the Colleges. For example, professionals in the lawyer profession group can earn up to 10 points for being a member of the American College of Bankruptcy Lawyers. In another example, professionals in the dental profession group can earn up to 10 points for holding a fellowship with the American College of Dentists.

In one embodiment, professionals that are members of more than one professional certification organization can earn up to 5 points for discretionary criteria, which is entered in box number twelve in scoring data area 22 in GUI 20 and stored. In another embodiment, professionals can earn points for demonstrating activity within a professional certification organization above and beyond just being certified, including but not limited to serving on a special panel of mediators, being appointed by a judge or professional group, serving as an arbitrator/mediator for a certain court, serving as a neutral intermediary, and the like.

There may be a 5 point maximum for the objective criterion of representative clients. Other suitable maximums may be used. A professional's score for this criterion is entered in box number four in scoring data area 22 in GUI 20 and stored. Characteristics about the representative clients are used when allotting points for this criterion. These characteristics include but are not limited to large companies, celebrities, groups of people, and the like. Some professionals are not able to list specific clients due to confidentiality concerns. In this case, descriptions or codes can be used to identify client characteristics. Professionals with a large number of representative clients that are large companies, celebrities, large groups of people, and the like can earn points in the discretionary criteria, which is entered in box number twelve in scoring data area 22 in GUI 20 and stored.

There may be a 3 point maximum for the objective criterion of experience. Other suitable maximums may be used. A professional's score for this criterion is entered in box number five in scoring data area 22 in GUI 20 and stored. The longer a professional works in a specific area the more experienced they become. In one embodiment, experience is scored based upon years of experience in a profession sub-group. In another embodiment, experience is scored based upon total years working in a profession group.

There may be a 5 point maximum for the objective criterion of position within the firm or employer. Other suitable maximums may be used. A professional's score for this criterion is entered in box number six in scoring data area 22 in GUI 20 and stored. Professionals can earn up to the maximum number of points for being a founder or named partner in a company, firm, etc. In one embodiment, solo practitioners or small group practitioners can earn fewer points. Professionals in management, directors, or other types of leadership positions can earn up to the maximum number of points. The number of points can depend on the size of the organization for which the professional is serving in a leadership capacity.

There may be a 3 point maximum for the objective criterion of professional activities. Other suitable maximums may be used. A professional's score for this criterion is entered in box number seven in scoring data area 22 in GUI 20 and recorded. Professionals can earn up to the maximum number of points for leading a professional group. Professionals can also earn points for indicating involvement in professional organizations, including but not limited to membership on a board of directors, or faculty member of a continuing education program, and the like. In one embodiment, professionals can only earn points for professional activities engaged in during a predetermined time period. In another embodiment, professionals do not earn points for merely being a member of a professional group.

There may be a 5 point maximum for the objective criterion of writings and lectures. Other suitable maximums may be used. A professional's score for this criterion is entered in box number eight in scoring data area 22 in GUI 20 and stored. Speaking at professional meetings and/or conferences, authoring articles, chapters, books, manuals, and the like can be considered when allotting points for this criterion. Work as an adjunct professor can also be considered when allotting points for this criterion.

There may be a 3 point maximum for the objective criterion of volunteer, pro bono and community work. Other suitable maximums may be used. A professional's score for this criterion is entered in box number nine in scoring data area 22 in GUI 20 and scored. When determining points for this criterion, service on non-profit boards, pro-bono representation, multiple listings, and involvement in community work can be considered. Points for this criterion can be in addition to points awarded for representative clients or transactions. In one embodiment, associations with entry or registration fees are not included in this criterion.

There may be a 2 point maximum for the objective criterion of preparatory background. Other suitable maximums may be used. A professional's score for this criterion is entered in box number ten in scoring data area 22 in GUI 20 and scored. When determining points for this criterion, stature of the school from which a professional earned his/her degree, involvement in student run professional and/or scholar organizations, special clerkships or internships, degree honors, class rank, and the like can be considered.

There may be a 3 point maximum for the objective criterion of courts. Other suitable maximums may be used. A professional's score for this criterion is entered in box number eleven in scoring data area 22 in GUI 20 and stored. When determining the number of points for this criterion points can be allotted for Supreme Court admission, Court of Appeals admission, state/jurisdiction/country admissions listed beyond geographic limits of primary practice area, and the like. In one embodiment, no points are given for specialty courts, such as tax court, bankruptcy court, and the like.

There may be a 5 point maximum for discretionary criteria. Other suitable maximums may be used. A professional's score for this criterion is entered in box twelve in scoring data area 22 in GUI 20 and stored. This category is designated to award points to professionals for activities that are not defined in the foregoing objective criteria categories. These activities include but are not limited to political activity, speaking different languages, international recognition/expertise, higher than normal activity in one of the foregoing objective criteria categories, and the like.

In a further embodiment of the present invention, the scores entered for the variety of criteria in scoring data area 22 in GUI 20 are based on a manual or a set of instructions provided to user of the GUI 20, with the manual or set of instructions providing suggested scores for each of the plurality of criteria according to common achievements. In an additional embodiment, a current or former member of the profession group provides oversight throughout the process of step 14 for evaluating individuals within a candidate pool, thereby ensuring that characteristics of a particular candidate are not being rated too highly or being improperly overlooked by the set of objective criteria.

Referring again to FIG. 1, the results of step 14 for evaluating individuals within a candidate pool are used to determine the top ranking candidates and send the top ranking candidates to peer evaluators for further evaluation as in step 16. The peer evaluators are selected themselves as top ranking candidates within the profession group. For example, the peer evaluators may be selected as the top 200 to 400 performing candidates in the local geographic area of the profession group. In a further embodiment, peer evaluators are selected from the top point earners in various sub-groups within a profession group. In an additional embodiment, the peer evaluators may be selected based on top performance within the present year or previous years.

In one embodiment, identifying the correct professional sub-groups for each candidate when evaluating individuals with independent research in step 14 helps perform a more accurate peer evaluation process, as professional sub-group classifications may be used to further refine selection of the proper peer evaluators. In an additional embodiment, the peer evaluation group may be divided into a number of sub-groups to obtain a more accurate response or to present the peer evaluators with a smaller number of candidates to review.

Peer evaluation instructions are sent to the selected peer evaluators after completing step 14 for evaluation of individuals within a candidate pool. Peer evaluators are required to evaluate and score a list of the top ranking candidates from their profession and/or profession sub-group. Additionally, peer evaluation can be conducted manually and/or via a computer process. New candidates can be added during step 16 but they will need to be independently evaluated according to the objective criteria according to step 14 as previously discussed.

The top ranking candidates who are evaluated by the peer evaluation process 16 are then provided a point score from the peer evaluation. In one embodiment, the peer evaluators grade the list of the top ranking candidates on a point scale of 1 to 10. Accordingly, the scores obtained from the peer evaluators are averaged for each candidate. In another embodiment, each peer evaluator is provided only with the names of the top ranking candidates, and is unable to provide a score for himself or herself.

Once results from step 16 for peer evaluation are received, step 18 for final selection of the excellent performing candidates is conducted. In one embodiment, the points produced by the peer evaluation are combined with the points previously obtained from scoring the candidate against objective criteria in the independent research step 14. In a further embodiment, the points obtained for the candidate within the peer evaluation step 16 are multiplied by some predetermined multiplier value, which allows a weighted value to be provided to the results of the peer evaluation as compared to the value obtained from the results of the independent research. In one embodiment, the predetermined multiplier value applied to the average peer evaluation score of each candidate is 2.4.

In one embodiment, the step 18 for final selection also considers points obtained as a result of the peer nomination step 12. During step 12, points may be allocated to a candidate based on the type of nomination received for the candidate. In a further embodiment, 5 points are awarded for nominations of the candidate from persons outside of their firm or organization, and 3 points are awarded for nominations of the person from others within the nominee's firm or organization.

Based on the final selection in step 18, the candidates may be divided into groups based on geographic areas, size of the organization for which they work, profession sub-groups, and the like. The candidates having the highest point totals within the selected group are identified as demonstrating excellent performance in that selected group. For example, only 5% of the total lawyers in a state may be identified as demonstrating excellent performance in the legal profession.

In one embodiment, the top scoring candidates in a geographic area are identified as excellent performing professionals after being divided into groups based on firm or organization size. For example, all attorneys may be divided into four categories for practitioners in large-sized law firms, practitioners in medium-sized law firms, practitioners in small law firms, and solo practitioners. In a further embodiment, because there may not be an equal number of excellent performing professionals at each firm or organization size level, the number of the identified excellent performing professionals may be restricted or increased to produce a similar number of professionals at each firm or organization level. For example, attorney candidates with the highest scores are selected from each law firm size category until a total pool of approximately 5% is reached. In contrast, the size of the candidate pool for doctors is 10%.

In another example, only 10% of all professional engineers in an electrical engineering sub-group may be identified as demonstrating excellent performance within the past year. In one embodiment, a report showing the identified candidates and other relevant information, including but not limited to profession group and/or sub-group, geographic area, predetermined time period, point totals and the like, is generated and outputted in a tangible medium.

Various safeguards can be employed to ensure accuracy and legitimacy of information related to each candidate. One example of these safeguards is inspection of surveys or ballots for evidence of manipulation. If evidence of manipulation is discovered, professionals nominated via the manipulated ballot are eliminated from the candidate pool. Another exemplary safeguard is tracking of who votes for whom to detect whether nominees are voting for one another. The overall point totals for individuals who were nominated by the same professional that they nominated can be reduced to safeguard against nomination reciprocity agreements.

Another exemplary safeguard is tracking of whether nominees were nominated by their colleagues or by other professionals. The overall point totals for individuals who are nominated by their colleagues in their firm or organization can be reduced to ensure that individuals working in larger organizations do not have an unfair advantage. In yet another exemplary safeguard, candidates are checked for good standing with certification and/or licensing authorities applicable to particular profession groups and/or sub-groups. Individuals that are not in good standing with these certification and/or licensing authorities are eliminated from the pool before proceeding to step 16 for peer evaluation. For example, verification may be made with state disciplinary and/or license authorities in addition to direct written confirmation from the candidates. Still another exemplary safeguard includes independent verification of all material submitted as indicia of a nominee's performance in the profession group and/or sub-group. These safeguards can be conducted manually and/or via a computer process. For example, a search on an interne search engine may be used to identify any negative matters for the candidates.

Figure 3:
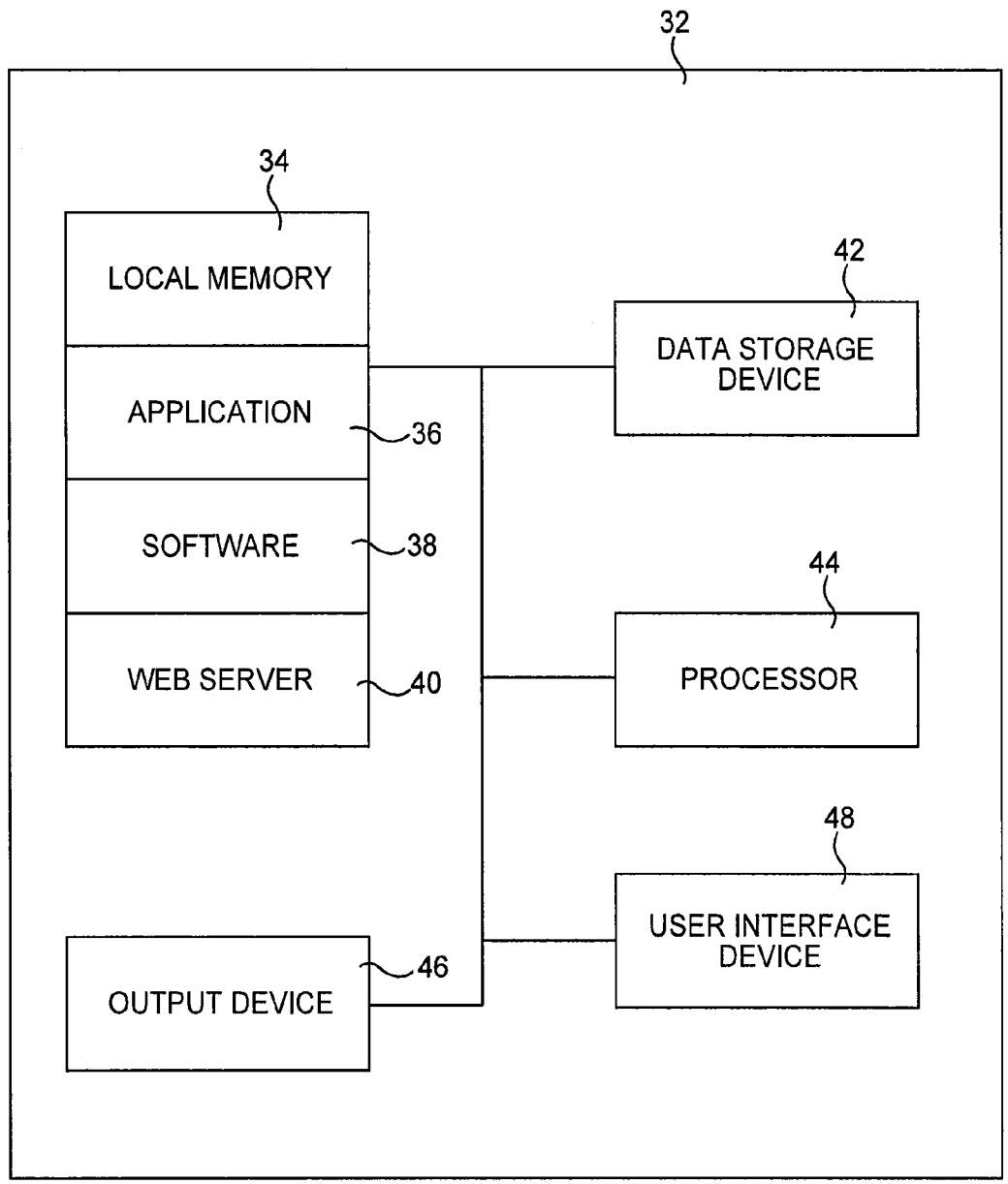
FIG. 3 is a block diagram of the exemplary components of a processing configuration used in the system of the present invention.

In one embodiment, the method for identifying excellent performance of professionals can be conducted via a processing device 32 as shown in FIG. 3. Processing device 32 includes a local memory 34, a data storage device 42, a processor 44, a user interface device 48 and an output device 46. Local memory 34 may include random access memory (RAM) or similar types of memory, and it may store one or more applications 36, including software 38 configured to receive, store and process information related to identifying excellent performance within a profession, and a web server 40, for execution by processor 44. Local memory 34 is generally located in individual pieces of equipment used to receive, store and process information related to identifying excellent performance within a profession. Data storage device 42 may include a hard disk drive, floppy disk drive, CD-ROM drive, or other types of non-volatile data storage. The local cache, database, or data store that includes a candidate's data may be stored on data storage device 42. Processor 44 may execute software 38 and other applications 36 stored in local memory 34 or data storage device 42. Processor 44 may execute software 38 in order to provide the functions described in this specification including, but not limited to receiving, storing, and/or processing information related to identifying excellent performance within a profession. User interface device 48 may include any device for entering information into processing device 32, such as a keyboard, mouse, cursor-control device, touch-screen, infrared, microphone, digital camera, video recorder, or any other instrument or device necessary to receive, store and process information related to identifying excellent performance within a profession. Output device 46 may include any type of device for presenting information, including but not limited to printers, display devices such as monitors, and any other types of output devices including speakers or any device for providing information in audio form.

Software 38 includes databases, knowledge bases, web enabling components, graphical user interface components, and the like. Software can be configured to output camera-ready data to be used in publications. Software can be further configured to provide various functions, including but not limited to production, accounting, billing, order tracking, sales and marketing, and the like. Alpha numeric and non-alpha numeric data can be handled, correlated, stored, accessed, created, and manipulated to provide a wide range of functions.

Web server 40 is used to provide access to candidate data stored in local memory 34 and on data storage devices 42 and display the data. Web server 40 allows users secure remote access to the system through which they can enter, access, and/or process information related to identifying excellent performance within a profession. Web server 40 can allow access to a user running a web browser. Any web browser, co-browser, or other application capable of retrieving content from a network and displaying pages or screens may be used.

Examples of processing devices 32 for interacting within the present system include embedded microprocessors, digital signal processors, personal computers, laptop computers, notebook computers, palm top computers, network computers, Internet appliances, or any processor-controlled device capable of storing data, software 38 and any other type of application 36 stored in local memory 34 or accessible via data storage devices 42.

Figure 4:
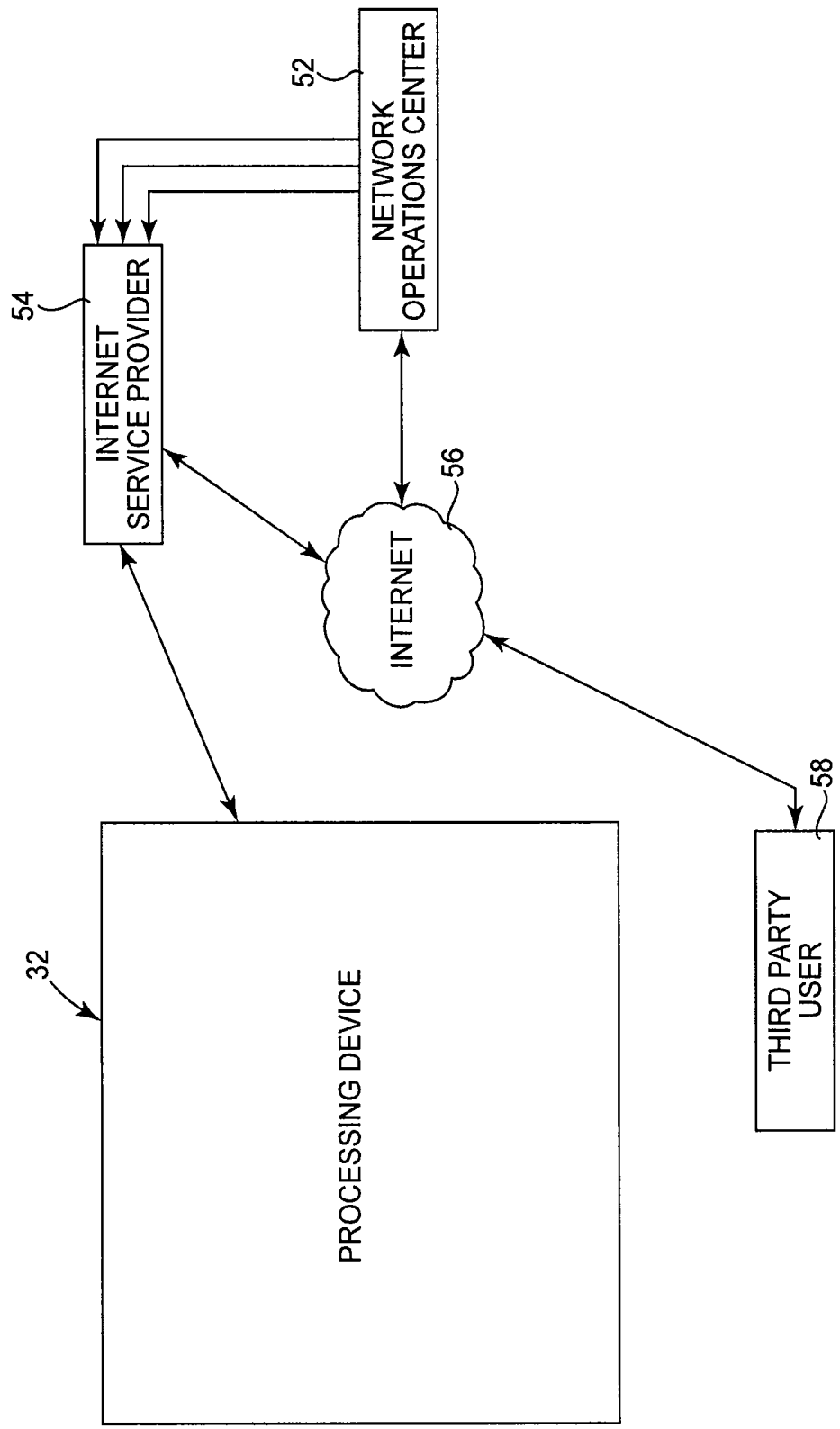
FIG. 4 is a block diagram illustrating exemplary components of the system of the present invention as incorporated into to a network system for remote access.

Referring now to FIG. 4, in an alternate embodiment in accordance with the present invention, processing device 32 may be integrated within a network for remote access to and use of the system and method for identifying excellent performance within a profession. This allows for centralized data storage and archival of system information, candidate information, research data, evaluation information, output reports and the like. Additionally, networking provides for information export and query capabilities that can be used for candidate file management, research and evaluation management and the like. Network 52 may be either locally contained or accessible via Internet 56 and optionally through an Internet service provider 54. Connection to the network 52 may be wired or, alternatively, wireless and may incorporate control from a detached device (e.g., handheld, laptop, tablet, or other mobile device). In addition, processing device 32 may be accessible remotely by a third party user 58 via Internet 56 and/or Internet service provider 54.

While the invention has been described with reference to the specific embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method on a processing device for identifying excellent performance of candidates within a profession group, the processing device comprising a processor, a user interface device, and a data storage device, the method comprising:
   creating a candidate pool by selecting individuals from a profession group, including:
       receiving and processing a survey of peer professionals working within the profession group, wherein the peer professionals nominate other individuals within the profession group, wherein a minimum set of qualifications exist for each of the peer professionals to provide nominations;

performing independent research to identify individuals, the independent research comprising data mining to identify the individuals who satisfy predefined criteria for outstanding performance within the profession group, wherein the data mining includes querying electronic data sources containing relevant biographical information for the individuals within the profession group; and selecting candidates for the candidate pool based on a combination of the results produced by the survey of peer professionals and the independent research, wherein the combination is performed using a computer operation which removes duplicate candidates;

wherein biographical information about individuals identified via the survey and the independent research is compiled for each individual within the candidate pool and stored in the data storage device;

evaluating the candidates individuals within the candidate pool, including:

performing, by the processor, independent research to evaluate performance of the candidates, the independent research comprising retrieval of performance information for the candidates relevant to objective criteria specific to the profession group, wherein the retrieval of performance information is performed independent of input from the individuals in the profession group and the peer professionals, and wherein the performance information is compiled for each candidate in the candidate pool and added to the information compiled for each candidate stored within the data storage device;

for each candidate within the candidate pool, storing in the data storage device a score for each objective criterion based on the performance information of each candidate stored in the data storage device;

for each candidate within the candidate pool, compiling with the processor a point total from the scores of each objective criterion; and identifying candidates with point totals in a first predetermined top percentage of candidates in the candidate pool;

conducting peer evaluations of only the candidates with point totals in the first predetermined top percentage of candidates in the candidate pool, including:

selecting peer evaluators from among the candidates having point totals in the first predetermined top percentage of candidates in the candidate pool;

obtaining, from the user interface device, peer evaluation scores from the selected peer evaluators; and producing, with the processor, an averaged peer evaluation score for each candidate in the first predetermined top percentage; and identifying, with the processor, candidates in a second predetermined top percentage of candidates in the candidate pool based on a function of the point totals compiled from the scores of each objective criterion and the peer evaluation scores obtained from the selected peer evaluators.

2. The method as in claim 1, further comprising dividing the individual candidates with point totals in a predetermined top percentage of candidates in the candidate pool into groups based on common characteristics.

3. The method as in claim 2, wherein the common characteristics include firm or organization size of the candidates.

4. The method as in claim 1, wherein the profession group is limited to practitioners located within a defined geographic area.

5. The method as in claim 1, wherein the nominations of peer professionals are tracked to prevent peer professionals from engaging in reciprocal voting.

6. The method as in claim 1, wherein the number of nominations provided by each of the peer professionals is limited to a predefined number.

7. The method as in claim 1, wherein creating a candidate pool further includes providing a point value for individuals who are nominated by peer professionals outside of the nominated individual's firm or organization, wherein the step of identifying candidates in the second predetermined top percentage of candidates in the candidate pool is based on a function of the point value.

8. The method as in claim 1, further comprising:

weighting the peer evaluation scores provided by the peer evaluators based on a predefined multiplier value; and wherein the step of identifying candidates in the second predetermined top percentage of candidates in the candidate pool is based on a function of the point totals compiled from the scores of each objective criterion and the weighted peer evaluation scores obtained from the selected peer evaluators.

9. The method as in claim 1, wherein independent verification is performed of all information material to the score for each objective criterion of the selected individual candidates.

10. The method as in claim 1, wherein a website is used to provide an interface to input and display data.

11. The method as in claim 1, wherein a report is generated onto a tangible medium showing the identified candidates and relevant information used in creating the report, the relevant information including one or more of profession group, profession sub-group, geographic area, predetermined time period, and point totals.

12. A computer program on a non-transitory computer readable medium, for execution by a computer to identify excellent performance of candidates within a profession group, the computer program comprising:

a code segment for creating a candidate pool by selecting individuals from a profession group, including:

processing a survey of peer professionals working within the profession group, wherein the peer professionals nominate other individuals within the profession group, wherein a minimum set of qualifications exist for each of the peer professionals to provide nominations;

performing independent research to identify individuals, the independent research comprising data mining to identify the individuals who satisfy predefined criteria for outstanding performance within the profession group, wherein the data mining includes querying electronic data sources containing relevant biographical information for the individuals within the profession group; and selecting candidates for the candidate pool based on a combination of the results produced by the survey of peer professionals and the independent research, wherein the combination is performed using a computer operation which removes duplicate candidates;

wherein biographical information about individuals identified via the survey and the independent research is compiled for each individual within the candidate pool and stored in a data store;

a code segment for evaluating the candidates within the candidate pool, including:
　performing independent research to evaluate performance of the candidates, the independent research comprising retrieval of performance information for the candidates relevant to objective criteria specific to the profession group, wherein the retrieval of performance information is performed independent of input from the individuals in the profession group and the peer professionals, and wherein the performance information is compiled for each candidate in the candidate pool and added to the information compiled for each candidate stored within the data store;
　for each candidate within the candidate pool storing in the data store a score for each objective criterion based on the performance information of each candidate stored in the data store;
　for each candidate within the candidate pool, compiling a point total from the scores of each objective criterion; and
　identifying candidates with point totals in a first predetermined top percentage of candidates in the candidate pool;
a code segment for conducting peer evaluations of only the candidates with point totals in the first predetermined top percentage of candidates in the candidate pool, including:
　selecting peer evaluators from among the candidates having point totals in the first predetermined top percentage of candidates in the candidate pool;
　obtaining peer evaluation scores from the selected peer evaluators; and
　producing an averaged peer evaluation score for each candidate in the first predetermined top percentage; and
a code segment for identifying candidates in a second predetermined top percentage of candidates in the candidate pool based on a function of the point totals compiled from the scores of each objective criterion and the peer evaluation scores obtained from the selected peer evaluators.

13. A computer system for identifying excellent performance of candidates within a profession group, comprising:
a candidate pool component for creating a candidate pool by selecting individuals from a profession group, the candidate pool component performing the steps of:
　processing a survey of peer professionals working within the profession group, wherein the peer professionals nominate other individuals within the profession group, wherein a minimum set of qualifications exist for each of the peer professionals to provide nominations;
　performing independent research to identify individuals, the independent research comprising data mining to identify the individuals who satisfy predefined criteria for outstanding performance within the profession group, wherein the data mining includes querying electronic data sources containing relevant biographical information for the individuals within the profession group; and
　selecting candidates for the candidate pool based on a combination of the results produced by the survey of peer professionals and the independent research, wherein the combination is performed using a computer operation which removes duplicate candidates;
　wherein biographical information about individuals identified via the survey and the independent research is compiled for each individual within the candidate pool and stored in a data store;
an evaluation component for evaluating the candidates within the candidate pool, the evaluation component performing the steps of:
　performing independent research to evaluate performance of the candidates, the independent research comprising retrieval of performance information for the candidates relevant to objective criteria specific to the profession group, wherein the retrieval of performance information is performed independent of input from the individuals in the profession group and the peer professionals, and wherein the performance information is compiled for each candidate in the candidate pool and added to the information compiled for each candidate stored within the data store;
　for each candidate within the candidate pool, storing in the data store a score for each objective criterion based on the performance information of each candidate stored in the data store;
　for each candidate within the candidate pool, compiling a point total from the scores of each objective criterion; and
　identifying candidates with point totals in a first predetermined top percentage candidates in the candidate pool;
a peer evaluation component for conducting peer evaluations of only the candidates with point totals in the first predetermined top percentage of candidates in the candidate pool, the peer evaluation component performing the steps of:
　selecting peer evaluators from among the candidates having point totals in the first predetermined top percentage of candidates in the candidate pool;
　obtaining peer evaluation scores from the selected peer evaluators; and
　producing an averaged peer evaluation score for each candidate in the first predetermined top percentage; and
an identification component for identifying candidates in a second predetermined top percentage of candidates in the candidate pool based on a function of the point totals compiled from the scores for each objective criterion and the peer evaluation scores obtained from the selected peer evaluators.

\* \* \* \* \*